USO10786749B2

(12) United States Patent
Chatroux (10) Patent No.: US 10,786,749 B2
(45) Date of Patent: Sep. 29, 2020

(54) DEVICE FOR CONVERTING A LIQUID INTO VAPOUR AND ASSOCIATED METHOD FOR REGULATING A HEATING POWER

(71) Applicant: Commissariat a l'Energie Atomique et aux Energies Alternatives, Paris (FR)

(72) Inventor: Andre Chatroux, Tullins (FR)

(73) Assignee: Commissariat a l'Energie Atomique et aux Energies (FR)

( * ) Notice: Subject to any disclaimer, the term of this patent is extended or adjusted under 35 U.S.C. 154(b) by 0 days.

(21) Appl. No.: 15/761,343

(22) PCT Filed: Sep. 28, 2016

(86) PCT No.: PCT/EP2016/073081
§ 371 (c)(1),
(2) Date: Mar. 19, 2018

(87) PCT Pub. No.: WO2017/055335
PCT Pub. Date: Apr. 6, 2017

(65) Prior Publication Data
US 2018/0264374 A1 Sep. 20, 2018

(30) Foreign Application Priority Data
Sep. 28, 2015 (FR) ...................... 15 59098

(51) Int. Cl.
*B01D 1/02* (2006.01)
*B01D 1/00* (2006.01)
(Continued)

(52) U.S. Cl.
CPC ......... *B01D 1/0017* (2013.01); *B01D 1/0082* (2013.01); *B01D 1/02* (2013.01);
(Continued)

(58) Field of Classification Search
CPC ...... B01D 1/0017; B01D 1/0082; B01D 1/02; B01D 1/14; B01D 3/346; C02F 1/04;
(Continued)

(56) References Cited

U.S. PATENT DOCUMENTS 3,674,650 A * 7/1972 Fine ....................... B01D 35/18
202/176
4,110,170 A * 8/1978 Kirschman .......... B01D 1/0082
202/160
(Continued)

FOREIGN PATENT DOCUMENTS

EP 1151705 A1 11/2001
FR 1060544 A 4/1954
(Continued)

*Primary Examiner* — Jonathan Miller
(74) *Attorney, Agent, or Firm* — Forge IP, PLLC (57) ABSTRACT

A device for converting a liquid into vapor, having an evaporation surface, a liquid inlet, a heater for heating the evaporation surface, a flow controller, a control unit configured to control a liquid flow rate injected into the liquid inlet, a chamber containing the evaporation surface, and a temperature sensor arranged on the evaporation surface. The control unit is configured to control a heating power of the heater according to a flow rate and to a temperature measured by the temperature sensor according to a predetermined control law. The predetermined control law varies, for each flow rate, non-linearly and inversely proportionally to the difference between a reference temperature of the chamber and the measured temperature.

10 Claims, 4 Drawing Sheets

(51) Int. Cl.
 B01D 1/14 (2006.01)
 B01D 3/34 (2006.01)
 F22B 1/28 (2006.01)
 F22B 1/30 (2006.01)
 F22B 35/00 (2006.01)

(52) U.S. Cl.
 CPC .............. B01D 1/14 (2013.01); B01D 3/346 (2013.01); F22B 1/28 (2013.01); F22B 1/287 (2013.01); F22B 1/30 (2013.01); F22B 35/005 (2013.01); Y02E 60/366 (2013.01)

(58) Field of Classification Search
 CPC .... F22B 1/28; F22B 1/287; F22B 1/30; F22B 35/005
 See application file for complete search history.

(56) References Cited

U.S. PATENT DOCUMENTS

| | | | | |
|---|---|---|---|---|
| 5,053,111 | A * | 10/1991 | Ellerbe, Jr. | B01D 3/02 137/391 |
| 6,010,599 | A * | 1/2000 | Wang | B01D 3/007 202/188 |
| 7,244,353 | B2 * | 7/2007 | Whitmore | B01B 1/005 196/121 |
| 7,292,899 | B2 * | 11/2007 | Dadebo | B01D 3/4211 62/643 |
| 8,246,820 | B2 * | 8/2012 | Geiger | B01D 35/185 123/196 A |
| 8,409,435 | B2 * | 4/2013 | Geiger | B01D 1/0017 210/149 |
| 8,623,218 | B2 * | 1/2014 | Geiger | B01D 1/0017 123/196 A |
| 8,623,219 | B2 * | 1/2014 | Geiger | B01D 1/0082 123/196 A |
| 2010/0025341 | A1 | 2/2010 | Priest et al. | |
| 2013/0011804 | A1 | 1/2013 | Seo et al. | |

FOREIGN PATENT DOCUMENTS

| | | |
|---|---|---|
| FR | 2861974 A1 | 5/2005 |
| WO | WO0029787 A1 | 5/2000 |

* cited by examiner

DEVICE FOR CONVERTING A LIQUID INTO VAPOUR AND ASSOCIATED METHOD FOR REGULATING A HEATING POWER

FIELD OF TECHNOLOGY

The present disclosure relates to the field of vapor generators, and particularly to vapor generators used in high temperature steam electrolyzers (HTSE).

The present disclosure more specifically relates to a device for converting a liquid into vapor capable of supplying a low vapor flow rate, particularly, a vapor flow rate particularly in the range from 10 g/h to 10 kg/h and operating a constant pressure, particularly at the atmospheric pressure or under a few tens of bars.

The present disclosure also relates to the method of regulating the heating power of the device for converting a liquid into vapor.

BACKGROUND

A high temperature steam electrolyzer (HTSE) is an electrochemical device for generating hydrogen from steam by application of an electric current to a stack of electrolytic cells electrically connected in series and each formed of two electrodes, that is, a cathode and an anode, interposing a solid oxide electrolytic membrane. Generally, steam is introduced at the cathode of each cell powered with electricity, and a reaction of electrochemical reduction of the steam results in the forming of hydrogen on the cathode.

Generally, for a given operating point of the electrolyzer, there exists an electric current to be applied thereto, and the steam or vapor flow to be introduced into the electrolyzer is calculated according to the intensity of the electric current applied to the electrolyzer. Since the current intensity may generally vary from 0 to 100% of the operating range of the electrolyzer, the vapor flow to be generated should also be able to linearly vary from 0 to 100% of the capacity, and should only be made of vapor.

Further, an electrolyzer is a system very sensitive to current/gas flow inhomogeneities, such inhomogeneities being indeed capable of causing a premature aging of the electrolyzer. For example, if the vapor flow rate varies around its set point value, an instability of the operating point of the electrolyzer can be observed, resulting in variations of the cell voltage, which is a cause of premature aging. Worse, strong variations of the vapor flow rate result in variations of the pressure by a few tens or hundreds of mbars, which may be sufficient to damage the seals or even crack the electrochemical cells. A vapor flow rate which is as homogeneous and regular as possible is thus desired.

Vapor generation devices generally comprise a heated evaporation surface, having a liquid deposited thereon to generate the evaporation of the liquid. For example, document WO 2000/29787 describes a laundry iron capable of generating vapor to improve the ironing. The quantity of generated vapor may be adjusted over time by modulation of the flow rate of liquid which is deposited on the heating surface.

However, the variation of the liquid flow rate on the heating surface induces transient overpressures, also called vapor puffs. Such transient overpressures are due to the fact that the liquid will cover a larger portion of the heating surface, particularly areas which are at a temperature higher than the boiling temperature, causing an uncontrolled local vaporization. Such transient overpressures also appear in transient phases corresponding to a change in the flow rate set point.

The addition of buffer volumes may be a solution to limit transient overpressures, but this solution has the disadvantage of decreasing the reactivity of the vapor generator to set point changes and increases the complexity of the evaporator, especially in the case of an evaporator designed to operate at a pressure higher than the atmospheric pressure. Further, even though this solution decreases the amplitude of overpressures, it does not suppress them.

The technical problem of the invention is to limit transient overpressures of a device for converting a liquid into vapor.

SUMMARY OF THE DISCLOSURE

The present disclosure provides solving this technical problem by modulating the heating power of the heating surface according to the flow rate and according to a temperature of the heating surface.

For this purpose, according to a first aspect, the invention concerns a device for converting a liquid into vapor for a high-temperature vapor electrolyzer, this device comprising:
 an evaporation surface,
 a liquid inlet connected to the evaporation surface,
 means for heating the evaporation surface,
 a flow controller arranged at the level of the liquid inlet,
 a control unit configured to control a flow rate of liquid injected into the liquid inlet by the flow controller,
 a chamber containing the evaporation surface, said chamber having an opening connected to the liquid inlet and a vapor outlet, and
 a temperature sensor arranged on the evaporation surface.

The control unit is configured to control a heating power of the heating means according to a flow rate and to a temperature measured by the temperature sensor according to a predetermined control law, said predetermined control law varying, for each flow rate, non-linearly and inversely proportionally to the difference between a reference temperature of the chamber and the temperature measured by the temperature sensor.

The invention thus enables to control the temperature of the heating surface according to the flow rate and according to a residual temperature in the chamber containing the heating surface. Thus, the invention avoids overheating or underheating the heating surface with respect to the power necessary to enable the liquid to evaporate, thus limiting transient overpressures.

Phases of flow rate change are also anticipated to avoid transient overpressures. The non-linear variation, inversely proportional to the control law, enables, at a low flow rate, to anticipate an increase in the flow rate by reasonably overheating the heating surface above the reference temperature. Conversely, at a high flow rate, the variation of the control law enables to anticipate a decrease in the flow rate by reasonably decreasing the heating power of the heating surface below the reference temperature.

The regulation of the heating surface also allows an operation at a low average temperature, that is, in the order of 100° C. above the liquid boiling temperature, which limits thermal losses.

Further, the device is particularly simple to implement, since it requires a single temperature sensor. Preferably, the temperature sensor is positioned at the level of an end of the evaporation surface opposite to the end connected to the liquid inlet. "End of the evaporation surface" means the portion of the evaporation surface which extends all the way to a length of ⅓ of the evaporation surface, starting from the end opposite to the end connected to the liquid inlet. The positioning of the temperature sensor opposite to the liquid inlet enables to limit the interaction of the sensor with the liquid.

According to an embodiment, the device also comprises a gas inlet emerging into the chamber and a second flow controller arranged at the level of the gas inlet, the control unit being configured to control a heating power of the heating means according to a flow rate of the first flow controller, to a flow rate of the second flow controller, and to a temperature measured by the temperature sensor according to a predetermined control law. This embodiment enables to combine the evaporation of the liquid with a gas to form a gaseous mixture having a controlled concentration. As a variation, the device may comprise a plurality of gas inlets without changing the invention.

According to a second aspect, the invention relates to a method of regulating a heating power of the device according to the first aspect of the invention, the method comprising the steps of:
  if the flow rate set point is zero, regulating the heating power of the heating means to obtain a temperature of the chamber substantially equal to the reference temperature,
  if the flow rate set point is non-zero, calculating a theoretical heating power corresponding to the flow rate divided by a coefficient,
  correcting the theoretical heating power according to the temperature measured by the temperature sensor, and
  applying the corrected theoretical heating power to the heating means.

The theoretical heating power to be applied to the heating surface enables to distribute the liquid over practically the entire length of the heating surface but this is not sufficient to obtain a proper operation, particularly on changes of the flow rate set point. Indeed, at a low flow rate, an increase in the flow rate should be anticipated by reasonably overheating the heating surface above the reference temperature. Conversely, at a low flow rate, it is no longer possible to maintain the entire heating surface at the reference temperature since it is covered with liquid over a great length. However, in this case, it may be necessary to apply a lot of power if the liquid risks reaching the back of the chamber, in which area it will be only very poorly vaporized. The invention thus comprises defining, for each liquid flow to be vaporized, a correction of the power to be applied on the heating surface according to the measured temperature.

According to an embodiment, when the device comprises a gas inlet emerging into the chamber and a second flow controller arranged at the level of the gas inlet, the calculation of the theoretical heating power corresponds to the maximum power of the heating means as a percentage multiplied by the flow rate divided by a coefficient, added to the flow rate of the second flow controller divided by a second coefficient. This embodiment enables to add to the contribution of the flow rate of gas to be heated divided by a second coefficient taking into the specific heat capacity of the considered gas. Preferably, the first coefficient is determined according to the latent heat of vaporization of the considered liquid and to the specific heat capacity of the vapor and then refined by experimental tests to take thermal losses into account.

According to an embodiment, the reference temperature corresponds to an average temperature selected for the operation of the device for converting a liquid into vapor, the reference being higher than the vaporization temperature of the liquid.

According to an embodiment, the step of the correcting the theoretical heating power comprises the steps of:
  if the measured temperature is lower than a first temperature threshold, correcting the power by an addition of the maximum power of the heating means as a percentage multiplied by a first coefficient, the first temperature threshold being selected between the vaporization temperature of the liquid and the reference temperature,
  if the measured temperature is lower than a second temperature threshold, correcting the power by a subtraction of the maximum power of the heating means as a percentage multiplied by the temperature difference between the measured temperature and the second temperature threshold and by a second coefficient, the second temperature threshold being selected to be higher than the reference temperature,
  if the measured temperature is higher than the second temperature threshold, correcting the power by a subtraction of the maximum power of the heating means as a percentage multiplied by the temperature difference between the measured temperature and the second temperature threshold and by a third coefficient, and
  if the measured temperature is higher than a third temperature threshold, correcting the power by a subtraction of the maximum power of the heating means as a percentage multiplied by a fourth coefficient, the third temperature threshold being selected to be higher than the second temperature threshold.

This embodiment enables to regulate the operating chamber at a temperature at least equal to the reference temperature to avoid any risk of vapor condensation. The regulation enables to center the operation temperature of the device on the reference temperature, with an operating temperature range between a first temperature threshold and a third temperature threshold. The provided algorithm allows a self-adaptation to a change of flow rate due to the measured temperature, which reflects the history of the device use. Indeed, in practice, the measured temperature is inversely proportional to the quantity of liquid evaporated during the previous moments.

According to an embodiment, the step of correcting the theoretical heating power comprises the step of: if the measured temperature is higher than a fourth temperature threshold, correcting the power by a subtraction of the maximum power of the heating means as a percentage multiplied by a fifth coefficient, the fourth temperature threshold being selected to be higher than the third temperature threshold.

The fourth temperature threshold enables to stress the temperature limitation effect at the level of the upper limit of the range of operating temperatures.

According to an embodiment, the step of the correcting the theoretical heating power comprises the steps of:
  if the value of the corrected power is below zero, setting the power to zero, and
  if the value of the corrected power is greater than a maximum heating power, setting the power to the maximum heating power.

This embodiment enables to limit the power set point applied to the heating surface.

BRIEF DESCRIPTION OF THE DRAWINGS

The present invention will be better understood on reading of the following description provided as an example only in relation with the accompanying drawings, where the same reference numerals designate the same or similar elements, among which.

DETAILED DESCRIPTION

Figure 1:
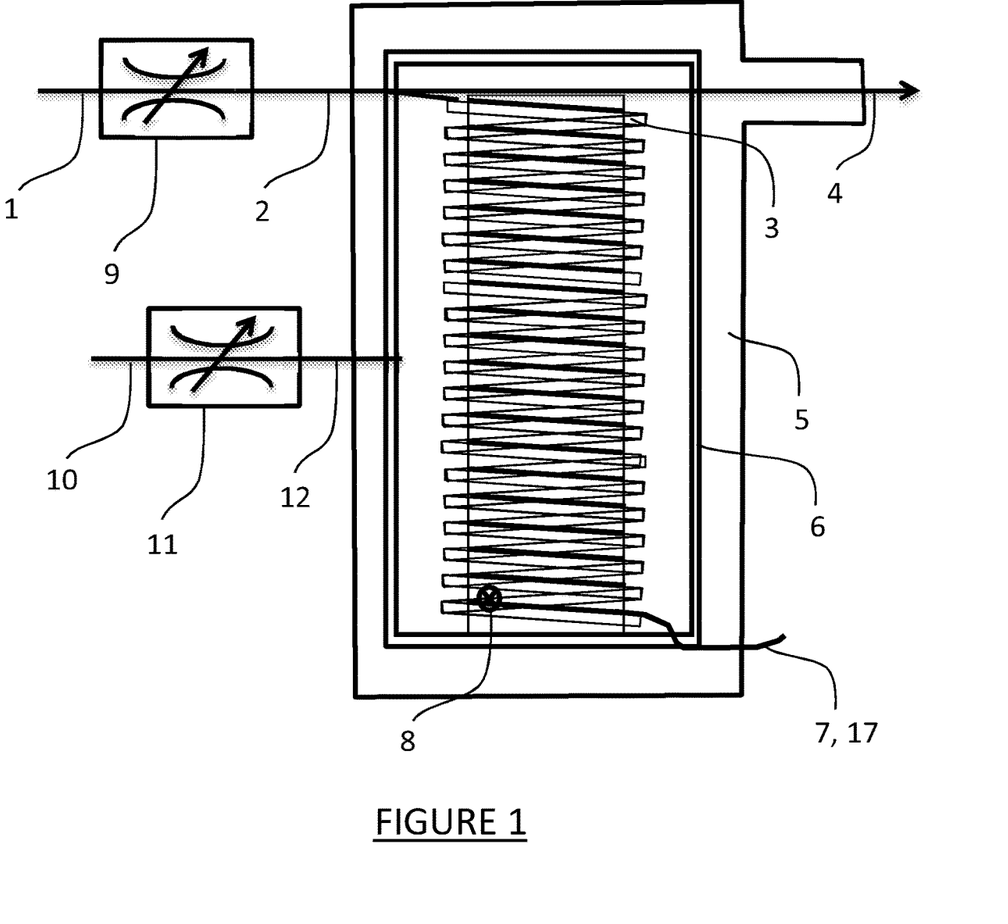
FIG. 1 is a simplified representation of a device for converting a liquid into vapor according to an embodiment of the invention.

FIG. 1 illustrates a device for converting a liquid into vapor comprising a chamber 6 provided with a vapor outlet 4 and with a liquid inlet 2, coupled to a first conventional flow controller 9, itself supplied from a liquid inlet 1. First flow controller 9 may be a commercial controller, for example, a thermal mass flow or Coriolis controller. Chamber 6 contains different elements ensuring the conversion of liquid into vapor, particularly, a helix 3 having a wire electric heating resistor, for example, having a round cross-section, used a heating surface 7 and as an evaporation surface 17, inserted therein. A temperature sensor 8 is installed in the lower portion of helix 3 in contact with the electric resistor. A thermally-insulating jacket 5 is arranged on the wall of the vapor generator to avoid cold spots. Preferably, jacket 5 is maintained at a temperature much higher than the boiling temperature of the liquid.

In the non-limiting example of FIG. 1, a gas flow controller 11, powered by a gas line 10, is connected to the vapor generator by an inlet 12 to enable the forming of a gaseous mixture.

A control unit, not shown, is connected to first controller 9, to second controller 11, to temperature sensor 8, and to the electric resistor, to control a flow rate $D_L$ in first controller 9, a flow rate $D_g$ in the second controller, and a heating power P of the electric resistor. Heating power P of the electric resistor is controlled according to flow rates $D_L$ and $D_g$ and to temperature T measured by temperature sensor 8 according to a control law.

Figure 2:
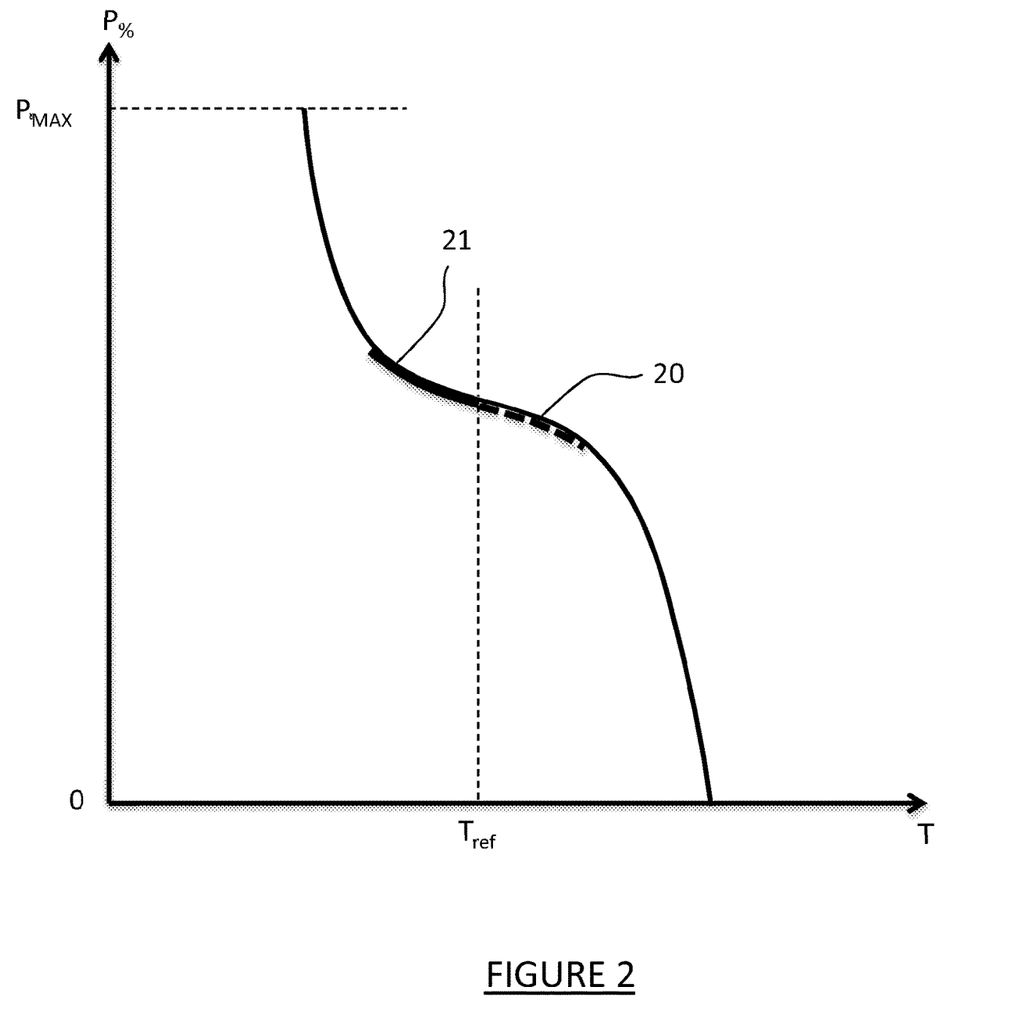
FIG. 2 is a law of control of the power of a heating surface according to the temperature of the device of FIG. 1 according to a first embodiment of the invention.

FIG. 2 illustrates such a control law of power P for two specific flow rates $D_L$ and $D_g$ according to temperature T. The control law is centered on a reference temperature $T_{ref}$, and varies non-linearly and inversely proportionally to the difference between reference temperature $T_{ref}$ and the measured temperature T. Power P is shown between zero Watt and the maximum power $P_{MAX}$ of heating surface 7. Theoretical power $P_T$ is positioned on portion 20 of the control law when flow rates $D_L$ and $D_g$ are low, which enables to anticipate an increase in the flow rate since the system operates at a temperature higher than $T_{ref}$. Conversely, portion 21 shows theoretical power $P_T$ when flow rates $D_L$ and $D_g$ are significant, while a decrease in these flow rates is anticipated since the system operates at a temperature lower than $T_{ref}$.

Figure 3:
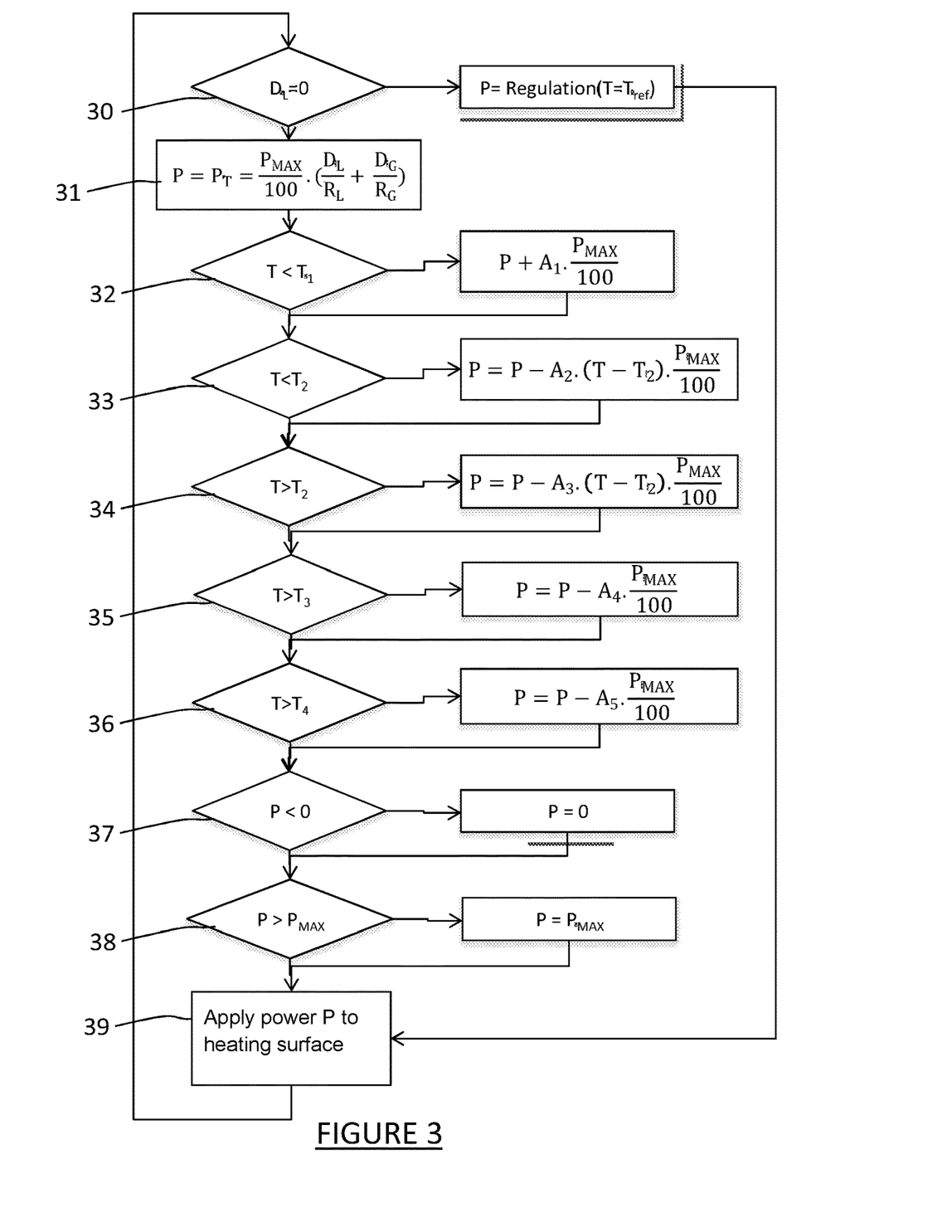
FIG. 3 is a flowchart showing the steps of regulation of the power of a heating surface of the device of FIG. 1 according to an embodiment of the invention.

FIG. 3 illustrates a flowchart of the method of regulating power P implemented with very simple functions, such as comparisons, additions, subtractions, or multiplications. The flowchart shows an automated loop of tests and calculations, which results in a value of power P which is applied to heating surface 7.

At a first step 30, when the generator vaporizes no liquid, that is, when flow controller 9 has a zero set point, then power P is adapted to maintain the heater cable at reference temperature $T_{ref}$. The regulation may be performed by a conventional regulation, of threshold or PID type.

At a step 31, when the generator vaporizes liquid, that is, when liquid flow controller 9 has a set point greater than zero, then a theoretical power $P_T$ is calculated according to the flow rate of liquid to be evaporated $D_L$ and to a coefficient $R_L$ taking into account the latent heat of vaporization of the considered liquid and the specific heat capacity of vapor, and the contribution of the flow rate of gas to be heated $D_G$ divided by a coefficient $R_G$ taking into account the specific heat capacity of the considered gas, according to the following formula:

$$P_T = \frac{P_{MAX}}{100} \cdot \left(\frac{D_L}{R_L} + \frac{D_G}{R_G}\right)$$

Power P to be applied to the heater cable is thus initialized with this theoretical value $P_T$ and will be adapted in the next steps according to temperature T.

$$P=P_T$$

At a step 32, the measured temperature T is compared with a first temperature threshold $T_1$ selected between the vaporization temperature $T_{vap}$ of the liquid and reference temperature $T_{ref}$. If the measured temperature T is lower than first temperature threshold $T_1$, then power P is increased by a positive coefficient $A_1$ greater than 1 according to the following formula:

$$T < T_1 \rightarrow P = P + A_1 \cdot \frac{P_{MAX}}{100}$$

At a step 33, the measured temperature T is compared with a second temperature threshold $T_2$ greater than reference temperature $T_{ref}$. If the measured temperature T is lower than second temperature threshold $T_2$, then power P is increased by a positive coefficient $A_2$ smaller than 1 according to the following formula:

$$T < T_2 \rightarrow P = P - A_2 \cdot (T - T_2) \cdot \frac{P_{MAX}}{100}$$

At a step 34, the measured temperature T is compared with the second temperature threshold $T_2$. If the measured temperature T is higher than second temperature threshold $T_2$, then power P is linearly decreased by a positive coefficient $A_3$ smaller than 1 according to the following formula:

$$T > T_2 \rightarrow P = P - A_3 \cdot (T - T_2) \cdot \frac{P_{MAX}}{100}$$

At a step 35, the measured temperature T is compared with a third temperature threshold $T_3$ higher than second temperature threshold $T_2$. If the measured temperature T is higher than third temperature threshold $T_3$, then power P is decreased by a positive coefficient $A_4$ greater than 1 according to the following formula:

$$T > T_3 \rightarrow P = P - A_4 \cdot \frac{P_{MAX}}{100}$$

At a step 36, the measured temperature T is compared with a fourth temperature threshold $T_4$, higher than third temperature threshold $T_3$. If the measured temperature T is higher than fourth temperature threshold $T_4$, then power P is decreased by a positive coefficient $A_5$ greater than 1 according to the following formula:

$$T > T_4 \rightarrow P = P - A_5 \cdot \frac{P_{MAX}}{100}$$

Steps 37 and 38 enable to limit the values of power P. If the result of the above calculations provides a value P smaller than zero, then P is set to zero. If the result of the above calculations provides a value P greater than $P_{MAX}$, then P is set to $P_{MAX}$. Eventually, at step 39, power set point P is applied to heating surface 7, after which the test loop starts again from the beginning.

Figure 4:
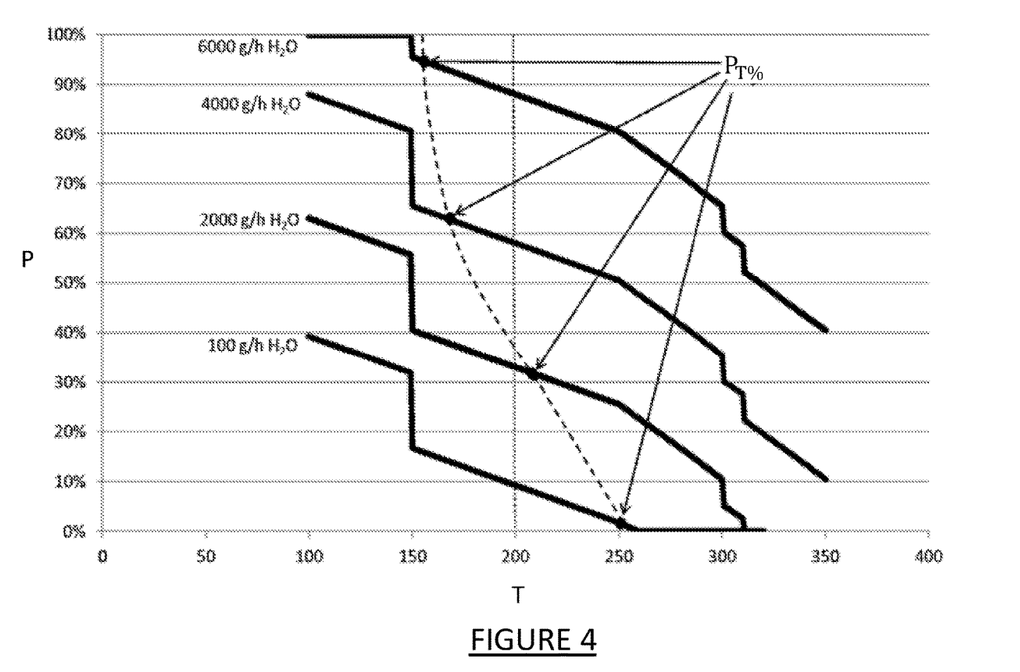
FIG. 4 is a representation of four laws of control of the power of a heating surface according to the temperature of the device of FIG. 1 according to second embodiment of the invention.

FIG. 4 illustrates the specific case of a device for converting water into vapor, integrating gas supplies with hydrogen and nitrogen. The maximum water flow rate is 6,400 g/h, that of hydrogen is 500 l/h, and that of nitrogen is 1,000 l/h. The maximum power $P_{Max}$ of the heating resistor is 6,000 W. Preferably, reference temperature $T_{ref}$ is in the range from 150° C. to 250° C. In the example of FIG. 4, reference temperature $T_{ref}$ is set to 200° C., that is, 100° C. above the boiling point of water.

At first step 30, when the generator vaporizes no liquid, that is, when flow controller 9 has a zero set point, then power P is adapted to maintain the heater cable at reference temperature $T_{ref}$, that is, 200° C.

At step 31, when the generator vaporizes liquid, that is, when liquid flow controller 9 has a set point greater than zero, then a theoretical power $P_T$ is calculated according to the water flow rate to be evaporated ($D_{H2O}$ in g/h), to the hydrogen flow rate ($D_{H2}$ in l/h), and to the nitrogen flow rate ($D_{N2}$ in l/h) according to the following formula:

$$P_T = \frac{P_{MAX}}{100} \cdot \left( \frac{D_{H2O}}{80} + \frac{D_{H2}}{500} + \frac{D_{N2}}{500} \right)$$

Numerical values 80 and 500 have been determined by calculation and then verified and refined by experimental tests:

Knowing that flow rate $D_{H2O}$ is in g/h, ratio $D_{H2O}/80$ corresponds to the percentage of the total power $P_{Max}$ necessary to evaporate 1 g/h of water, that is, the electric power $P_1$ necessary to heat a flow rate $D_0 = 1$ g/h=$2.78 \cdot 10^{-7}$ kg/s of water from 20 to 100° C. (1), $P_2$ for the evaporation (2), and $P_3$ to heat the generated vapor from 100 to 200° C. (3).

$P_1 = D_0 \cdot Cp_{water} \cdot (20-100) = 0.093$ W with $Cp_{water} = 4,195$ J/(kg·K)  (1)

$P_2 = D_0 \cdot C_{Lvapor} = 0.627$ W with $C_{Lvapor} = 2.26 \cdot 10^6$ J/kg  (2)

$P_3 = D_0 \cdot Cp_{vapor} \cdot (100-100) = 0.056$ W with $Cp_{vapor} = 2,030$ J/(kg·K)  (3)

The theoretical ratio is thus $P_{Max}/100/(P_1+P_2+P_3) = 77.2$

This theoretical ratio does not take into account thermal losses and has to be experimentally verified, which has led to selecting value 80 in the regulation algorithm.

Knowing that flow rate $D_{H2}$ is in l/h, ratio $D_{H2}/500$ corresponds to the percentage of the total power $P_{Max}$ necessary to heat 1 l/h of hydrogen, that is, the electric power $P_{H2}$ necessary to heat a flow rate $D_{H2}=1$ l/h=$2.78 \cdot 10^{-4}$ l/s of hydrogen from 20 to 200° C.

$P_{H2} = D_{H2} \cdot Cp_{H2} \cdot (20-200) = 0.035$ W with $Cp_{H2} = 1.27$ J/(l·K)

The theoretical ratio thus is $P_{Max}/100/P_{H2} = 1,695$

This theoretical ratio does not take into account thermal losses and has to be experimentally verified, which has led to selecting value 500 in the regulation algorithm.

The same type of calculation is performed for the $N_2$ gas. Knowing that flow rate $D_{N2}$ is in l/h, ratio $D_{N2}/500$ corresponds to the percentage of the total power $P_{Max}$ necessary to heat 1 l/h of nitrogen, that is, the electric power $P_{N2}$ necessary to heat a flow $D_{N2}=1$ l/h=$2.78 \cdot 10^{-4}$ l/s of nitrogen from 20 to 200° C.

$P_{H2} = D_{N2} \cdot Cp_{N2} \cdot (20-200) = 0.036$ W with $Cp_{N2} = 1.28$ J/(l·K)

The theoretical ratio thus is $P_{Max}/100/P_{N2} - 1,685$

This theoretical ratio does not take into account thermal losses and has to be experimentally verified, which has led to selecting value 500 in the regulation algorithm.

At step 32, the measured temperature T is compared with a first temperature threshold $T_1$ selected at 150° C. If the measured temperature T is lower than 150° C., then power P is decreased by a coefficient $A_1$ corresponding to value 15 according to the following formula:

$$T < 150° \text{ C.} \rightarrow P = P + 15 \cdot \frac{P_{MAX}}{100}$$

This 15% increase has been determined experimentally during tests of qualification of the vapor generator. The same has been done for coefficients $A_2$, $A_3$, $A_4$, and $A_5$.

At step 33, the measured temperature T is compared with a second temperature threshold $T_2$ selected at 250° C. If the measured temperature T is lower than 250° C., then power P is linearly decreased by a coefficient $A_2$ corresponding to value 0.15 according to the following formula:

$$T < 250° \text{ C.} \rightarrow P = P - 0.15 \cdot (T - 250) \cdot \frac{P_{MAX}}{100}$$

At step 34, the measured temperature T is compared with second temperature threshold $T_2$. If the measured temperature T is higher than 250° C., then power P is linearly decreased by a coefficient $A_3$ corresponding to value 0.3 according to the following formula:

$$T > 250° \text{ C.} \rightarrow P = P - 0.3 \cdot (T - 250) \cdot \frac{P_{MAX}}{100}$$

At step 35, the measured temperature T is compared with a third temperature threshold $T_3$ selected at 300. If the measured temperature T is higher than 300, then power P is decreased by a coefficient $A_4$ corresponding to value 5, that is, a 5% decrease, according to the following formula:

$$T > 300° \text{ C.} \rightarrow P = P - 5 \cdot \frac{P_{MAX}}{100}$$

At step 36, the measured temperature T is compared with a fourth temperature threshold $T_4$ selected at 310° C. If the measured temperature T is higher than 310° C., then power P is decreased by a coefficient $A_5$ corresponding to value 5, that is, a 5% decrease, according to the following formula:

$$T > 310° \text{ C.} \rightarrow P = P - 5 \cdot \frac{P_{MAX}}{100}$$

As a variation, the values of the temperature thresholds and of the coefficients may vary without changing the invention. For example, first temperature threshold $T_1$ may be in the range from 140° C. to 175° C. Second temperature threshold $T_2$ may be in the range from 220° C. to 280° C. Third temperature threshold $T_3$ may be in the range from 280° C. to 350° C. Fourth temperature threshold $T_4$ may be in the range from 300° C. to 350° C. Coefficients $A_1$, $A_2$ and $A_3$ may be in the range from 1.05 to 10. Coefficients $A_4$ and $A_5$ may be in the range from 0.1 to 1.

FIG. 4 illustrates the variation of power P according to the measured temperature T corresponding to typical production values covering the entire production range, with 100 g/h, 2,000 g/h, 4,000 g/h, and 6,000 g/h. The theoretical power $P_T$ is located above the reference temperature (200° C.) at a low flow rate (100 g/h, 2000 g/h) and below this temperature at a high flow rate (4,000 g/h and 6,000 g/h).

The tests performed with the invention, such as illustrated in FIG. 4, have proven to be fully satisfactory by allowing a stable regulation over long operating time periods at a constant flow rate and allowing significant flow rate changes without creating an overpressure which would adversely affect downstream equipment using the vapor.

The invention claimed is:

1. A device for converting a liquid into vapor for a high-temperature vapor electrolyzer, this device comprising:
    an evaporation surface,
    a liquid inlet connected to the evaporation surface,
    a heater for heating the evaporation surface,
    a flow controller arranged at a level of the liquid inlet, and
    a control unit configured to control a liquid flow rate ($D_L$) injected into the liquid inlet by the flow controller,
    wherein the device also comprises:
        a chamber containing a helix forming the evaporation surface, said chamber having an opening connected to the liquid inlet and a vapor outlet, said device being configured to input the liquid at a top of the helix and to allow the liquid to descend down the helix to form said evaporation surface; and
        a temperature sensor arranged on the evaporation surface,
    and wherein the control unit is configured to control a heating power (P) of the heater according to a flow rate ($D_L$) and to a temperature (T) measured by the temperature sensor according to a predetermined control law, said predetermined control law varying, for each flow rate ($D_L$), non-linearly and inversely proportionally to a difference between a reference temperature ($T_{ref}$) of the chamber and a temperature (T) measured by the temperature sensor.

2. The device for converting a liquid into vapor of claim 1, wherein the temperature sensor is positioned at a level of an end of the evaporation surface opposite to an end connected to the liquid inlet.

3. The device for converting a liquid into vapor of claim 1, wherein the device also comprises a gas inlet emerging into the chamber and a second flow controller, arranged at the level of the gas inlet, the control unit being configured to control a heating power (P) of the heater according to a flow rate ($D_L$) of the first flow controller, to a flow rate ($D_g$) of the second flow controller, and to a temperature (T) measured by the temperature sensor according to a predetermined control law.

4. A method of regulating a heating power (P) of the device for converting a liquid into vapor of claim 1, wherein the method comprises the steps of:
    if the flow rate set point ($D_L$) is zero, regulating the heating power (P) of the heater to obtain a temperature (T) of the chamber substantially equal to the reference temperature ($T_{ref}$),
    if the flow rate set point ($D_L$) is non-zero, calculating a theoretical heating power ($P_T$) corresponding to the flow rate ($D_L$) divided by a coefficient ($R_L$),
    correcting the theoretical heating power ($P_T$) according to the temperature (T) measured by the temperature sensor, and
    applying the corrected theoretical heating power to the heater.

5. The heating power regulation method of claim 4, wherein when the device comprises a gas inlet emerging into the chamber and a second flow controller arranged at the level of the gas inlet, the calculation of the theoretical heating power ($P_T$) corresponds to a maximum power ($P_{MAX}$) of the heater as a percentage multiplied by the flow rate ($D_L$) divided by a coefficient ($R_L$) added to the flow rate ($D_G$) of the second flow controller divided by a second coefficient ($R_G$).

6. The heating power regulation method of claim 4, wherein the coefficient ($R_L$) is determined according to the latent heat of vaporization of the considered liquid and to the specific heat capacity of the vapor.

7. The heating power regulation method of claim 4, wherein the reference temperature ($T_{ref}$) corresponds to an average temperature selected for operation of the device for converting a liquid into vapor, the reference temperature ($T_{ref}$) being higher than a vaporization temperature ($T_{vap}$) of the liquid.

8. The heating power regulation method of claim 4, wherein the step of correcting the theoretical heating power ($P_T$) comprises the steps of:
    if the measured temperature (T) is lower than a first temperature threshold ($T_1$), correcting the power (P) by an addition of a maximum power ($P_{MAX}$) of the heater as a percentage multiplied by a first coefficient ($A_1$), the first temperature threshold ($T_1$) being selected between a vaporization temperature ($T_{vap}$) of the liquid and the reference temperature ($T_{ref}$),
    if the measured temperature (T) is lower than a second temperature threshold ($T_2$), correcting the power (P) by a subtraction of the maximum power ($P_{MAX}$) of the heater as a percentage multiplied by the temperature difference between the measured temperature (T) and the second temperature threshold ($T_2$) and by a second coefficient ($A_2$), the second temperature threshold ($T_2$) being selected to be higher than the reference temperature ($T_{ref}$), if the measured temperature (T) is higher than the second temperature threshold ($T_2$), correcting the power (P) by a subtraction of the maximum power ($P_{MAX}$) of the heater as a percentage multiplied by the temperature difference between the measured temperature (T) and the second temperature threshold ($T_2$) and by a third coefficient ($A_3$), and if the measured temperature (T) is higher than a third temperature threshold ($T_3$), correcting the power (P) by a subtraction of the maximum power ($P_{MAX}$) of the heater as a percentage multiplied by a fourth coefficient ($A_4$), the third temperature threshold ($T_3$) being selected to be higher than the second temperature threshold ($T_2$).

9. The heating power regulation method of claim 8, wherein the step of correcting the theoretical heating power ($P_T$) comprises the step of: if the measured temperature (T) is higher than a fourth temperature threshold ($T_4$), correcting the power (P) by a subtraction of the maximum power ($P_{MAX}$) of the heater as a percentage multiplied by a fifth coefficient ($A_5$), the fourth temperature threshold ($T_4$) being selected to be higher than the third temperature threshold ($T_3$).

10. The heating power regulation method of claim 8, wherein the step of correcting the theoretical heating power ($P_T$) comprises the steps of:

if the value of the corrected power (P) is smaller than zero, setting the power (P) to zero, and if the value of the corrected power (P) is greater than a maximum heating power, setting the power (P) to the maximum heating power.

* * * * *